(12) United States Patent
Ishii et al.

(10) Patent No.: US 6,453,664 B2
(45) Date of Patent: Sep. 24, 2002

(54) CONTROL SYSTEM FOR INTERNAL COMBUSTION ENGINE

(75) Inventors: Atsushi Ishii; Hiroshi Maruyama; Naoto Fujimura, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,278

(22) Filed: Jan. 26, 2001

(30) Foreign Application Priority Data

Jan. 27, 2000 (JP) ........................................ 2000-019212

(51) Int. Cl.⁷ ................................................ F01N 3/00
(52) U.S. Cl. ............................ 60/284; 60/299; 60/285
(58) Field of Search ......................... 60/285, 284, 299; 123/406.53, 90.15

(56) References Cited

U.S. PATENT DOCUMENTS 5,946,906 A * 9/1999 Akazaki et al. ............... 60/284
5,950,419 A * 9/1999 Nishimura et al. ............ 60/284
6,212,879 B1 * 4/2001 Nishimura et al. ............ 60/285
6,237,327 B1 * 5/2001 Nishimura et al. ............ 60/285
6,266,957 B1 * 7/2001 Nozawa et al. ............... 60/285

FOREIGN PATENT DOCUMENTS

JP       10-299631       11/1998

* cited by examiner

*Primary Examiner*—Thomas Denion
*Assistant Examiner*—Diem Tran
(74) *Attorney, Agent, or Firm*—Arent Fox Kintner Plotkin & Kahn, PLLC

(57) ABSTRACT

A control system for an internal combustion engine having an exhaust system provided with a catalyst is provided. The control system comprises a catalyst temperature rise accelerating control in which the intake air amount is increased and the ignition timing is retarded according to the engine rotational speed. A transient control from the catalyst temperature rise accelerating control to the normal control, is started when the speed of a vehicle driven by the engine reaches a predetermined vehicle speed or higher during the catalyst temperature rise accelerating control. During the transient control, the intake air amount is gradually reduced and the ignition timing is set according to the vehicle speed.

10 Claims, 13 Drawing Sheets

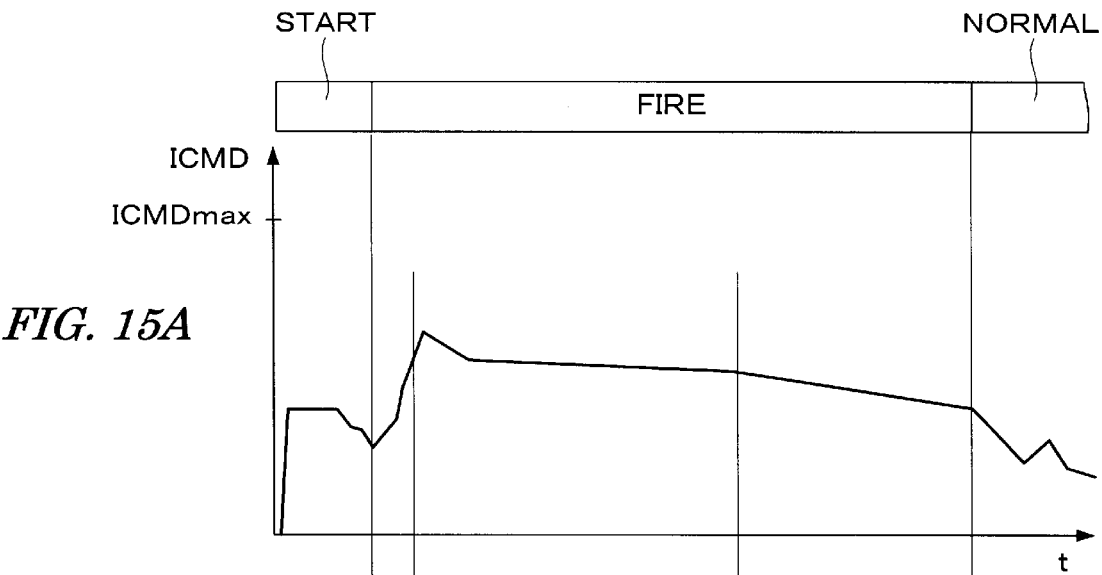
*FIG. 15A*
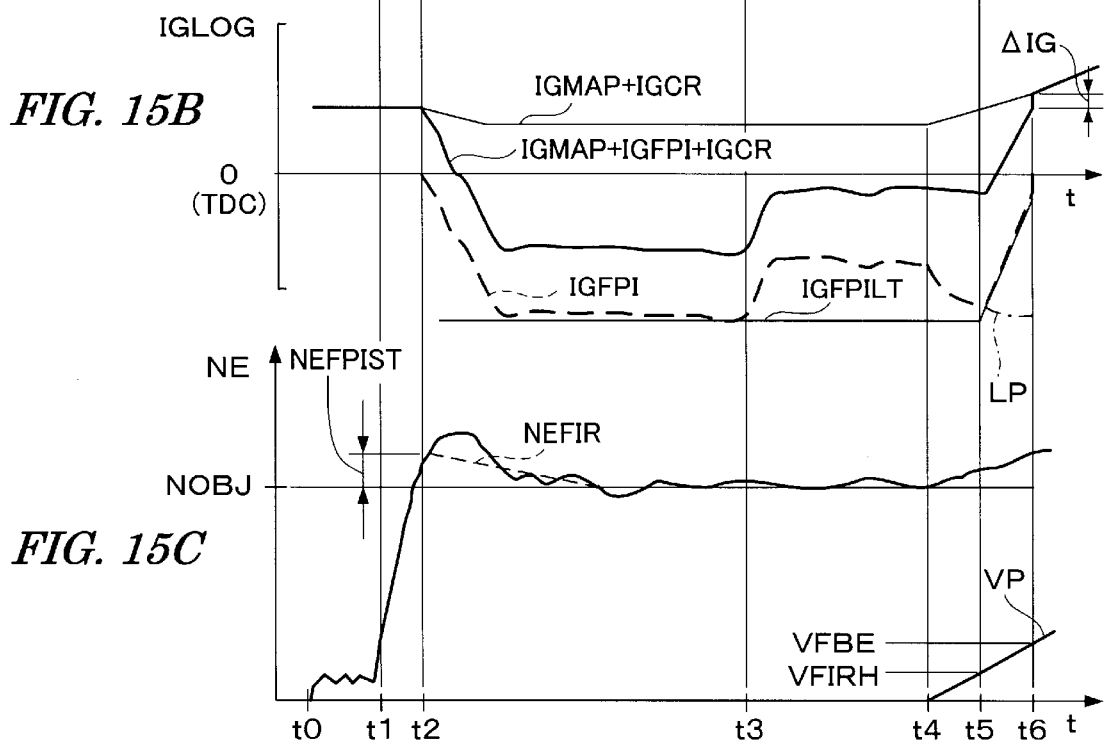
*FIG. 15B*
*FIG. 15C*

CONTROL SYSTEM FOR INTERNAL COMBUSTION ENGINE

BACKGROUND OF THE INVENTION

1. Field of the Invention

The present invention relates to a control system for an internal combustion engine that performs catalyst temperature rise accelerating control for accelerating the rise in temperature of a catalyst used for exhaust gas purification, and particularly to a control system that performs the control for the case in which the vehicle driven by the internal combustion engine starts to creep during execution of the catalyst temperature rise accelerating control.

2. Description of the Prior Art

The catalyst provided in an exhaust system of an internal combustion engine for purifying exhaust gases is inactive at low temperatures. Consequently, the catalyst does not purify the exhaust gases at low temperatures. Therefore, it is desirable to make the catalyst active early by rapidly increasing the temperature thereof immediately after start-up of the engine. In this regard, there is known a catalyst temperature rise accelerating control (disclosed in Japanese Patent Laid-open No. Hei 10-299631) in which immediately after start-up of an internal combustion engine, the intake air amount supplied to the engine is made larger than the amount for normal idling operation and also the ignition timing is feedback-controlled in the retard direction so that the engine rotational speed coincides with a target rotational speed, to thereby accelerate the temperature rise of the catalyst while keeping the engine rotational speed at the target rotational speed. According to this control, the temperature rise of the catalyst can be accelerated because the fuel supply amount becomes larger with the increasing intake air amount and thereby the heat generation amount becomes larger than that in the normal idling operation.

The catalyst temperature rise accelerating control is ended after the vehicle driven by the internal combustion engine starts running. However, if the control is immediately shifted to normal control, a torque shock occurs because of a rapid advance of the ignition timing as well as a rapid reduction in intake air amount. To cope with such an inconvenience, a transient control for gradually reducing the intake air amount while continuing the feedback control of the ignition timing is generally executed. With this transient control, the ignition timing is gradually changed in the advance direction, and the feedback control is ended at a time when the ignition timing becomes closer to a normal control value.

However, if the above-described prior art control method is applied to an engine of a vehicle having an automatic transmission, there may be a case in which a torque shock occurs due to a rapid change in the ignition timing when the catalyst temperature rise acceleration control is shifted to the normal control.

To be more specific, when the automatic transmission is in an in-gear state (a shift position is in a drive range or reverse range) and braking is released, the vehicle starts creeping, that is, running at a low speed. When the vehicle speed reaches a predetermined vehicle speed after the start of creeping, the catalyst temperature rise accelerating control is ended, and is shifted to a transient control for gradually reducing the intake air amount. At this time, since the engine rotational speed is increased with an increase in vehicle speed, the ignition timing is controlled to be retarded more than the retard amount during execution of the catalyst temperature rise accelerating control in order to keep the engine rotational speed at a constant value, which results in the condition that the ignition timing sticks to a value in the vicinity of the limit value on the retard side. As a result, there arises a problem that at the time when the vehicle speed is further increased and the feedback control of the ignition timing is ended, that is, when the normal control is started, a changed amount of the ignition timing in the advance direction becomes very large, resulting in a torque shock.

SUMMARY OF THE INVENTION

An object of the present invention is to provide a control system for an internal combustion engine, which is capable of preventing the occurrence of a torque shock, thereby maintaining good drivability in the case where a vehicle having an automatic transmission starts creeping during execution of catalyst temperature rise accelerating control.

To achieve the above object, according to a first aspect of the present invention, there is provided a control system for an internal combustion engine having an exhaust system provided with a catalyst. The control system comprises intake air amount control means for controlling the intake air amount of the engine; ignition timing control means for controlling the ignition timing of the engine; and catalyst temperature rise accelerating means for increasing, after starting of the engine, the intake air amount and retarding the ignition timing according to the engine rotational speed. The catalyst temperature rise accelerating means starts reduction of the intake air amount when the vehicle speed of the vehicle driven by the engine reaches a first predetermined vehicle speed or higher during operation of the catalyst temperature rise accelerating means, ends retard control of the ignition timing according to the engine rotational speed when the vehicle speed reaches a second predetermined vehicle speed higher than the first predetermined vehicle speed, and changes the retard limit value of the ignition timing according to the vehicle speed when the vehicle speed is between the first predetermined vehicle speed and the second predetermined vehicle speed.

With this configuration, the reduction in intake air amount is started when the vehicle speed reaches the first predetermined vehicle speed or higher during operation of the catalyst temperature rise accelerating means, and the retard control of the ignition timing according to the engine rotational speed is ended when the vehicle speed reaches the second predetermined vehicle speed higher than the first predetermined vehicle speed. Further, the retard limit value of the ignition timing is changed according to the vehicle speed when the vehicle speed is between the first predetermined vehicle speed and the second predetermined vehicle speed. Accordingly, by setting the retard limit value of the ignition timing at an optimum value according to the increase in vehicle speed, it is possible to prevent the occurrence of a torque shock and hence to maintain good drivablity in the case where a vehicle having an automatic transmission, starts creeping during execution of catalyst temperature rise control.

The catalyst temperature rise accelerating means preferably advances the retard limit value a greater amount as the vehicle speed becomes higher when the vehicle speed is between the first predetermined vehicle speed and the second predetermined vehicle speed.

With this configuration, since the retard limit value of the ignition timing is advanced a greater amount as the vehicle speed becomes higher when the vehicle speed is between the first predetermined vehicle speed and the second predetermined vehicle speed, it is possible to reduce the amount of change in the ignition timing at the time of ending the ignition timing control according to the engine rotational speed, to thereby prevent occurrence of torque shock.

The operation of the catalyst temperature rise accelerating means is preferably started when the engine rotational speed is equal to or higher than a predetermined lower limit rotational speed and the engine is in an idling condition.

The control system preferably further includes engine coolant temperature detecting means for detecting the engine coolant temperature, and the operating period of the catalyst temperature rise accelerating means is set according to the engine coolant temperature at starting of the engine.

The catalyst temperature rise accelerating means preferably sets the retard amount of the ignition timing so that the engine rotational speed coincides with the target rotational speed.

According to a second aspect of the present invention, there is provided a control system for an internal combustion engine having an exhaust system provided with a catalyst. The control system comprises intake air amount control means for controlling the intake air amount of the engine; ignition timing control means for controlling the ignition timing of the engine; and catalyst temperature rise accelerating means for increasing, after starting of the engine, the intake air amount and retarding of the ignition timing according to the engine rotational speed. The catalyst temperature rise accelerating means starts a transient control shifted to a normal control when the speed of the vehicle driven by the engine reaches a predetermined vehicle speed or higher during operation of the catalyst temperature rise accelerating means, and gradually reduces the intake air amount and sets the ignition timing according to the vehicle speed during the transient control.

With this configuration, the transient control shifted to the normal control is started when a vehicle speed becomes the predetermined vehicle speed or higher during operation of the catalyst temperature rise accelerating means. During the transient control, the intake air amount is gradually reduced and the ignition timing is set according to the vehicle speed. Accordingly, by setting the ignition timing at an optimum value according to the increase in vehicle speed, it is possible to prevent occurrence of a torque shock and hence to maintain good drivablity in the case where a vehicle having an automatic transmission starts creeping during execution of catalyst temperature rise control.

The catalyst temperature rise accelerating means preferably advances the ignition timing a greater amount as the vehicle speed becomes higher during the transient control.

Other objects and features of the invention will be more fully understood from the following detailed description and appended claims when taken with the accompanying drawings.

BRIEF DESCRIPTION OF THE DRAWINGS

FIG. 15 is a time chart illustrating an operation for executing the catalyst temperature rise accelerating control.

DETAILED DESCRIPTION OF THE PREFERRED EMBODIMENT

Some preferred embodiments of the present invention will now be described with reference to the drawings.

Figure 1:
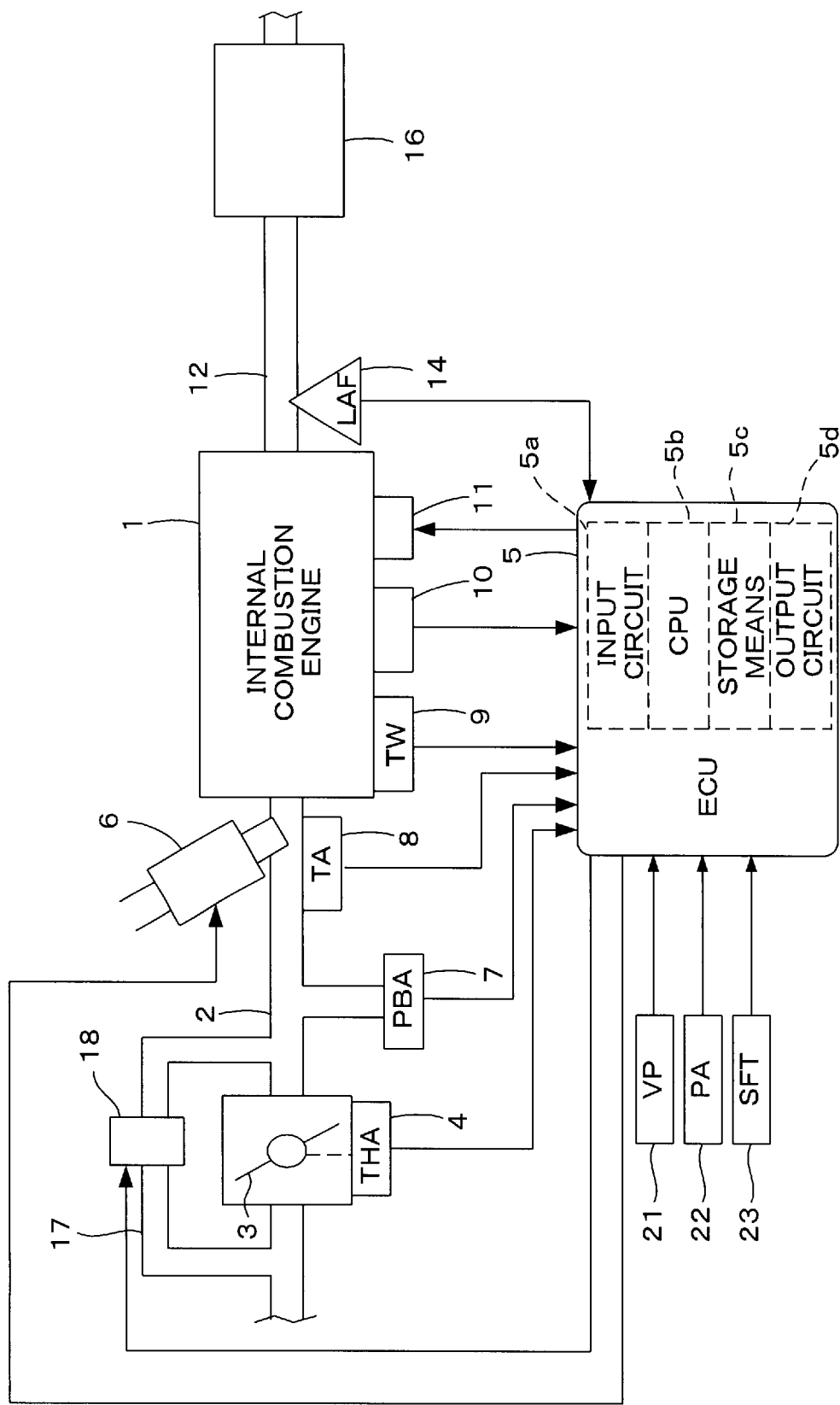
FIG. 1 is a block diagram of an internal combustion engine and a control system therefor according to an embodiment of the present invention.

Referring to FIG. 1, there is schematically shown a general configuration of an internal combustion engine (which will be hereinafter referred to as "engine") and a control system therefor according to a preferred embodiment of the present invention. The engine 1 is a four-cylinder engine, for example, and it has an intake pipe 2 provided with a throttle valve 3. A throttle valve opening (THA) sensor 4 is connected to the throttle valve 3, so as to output an electrical signal corresponding to an opening angle of the throttle valve 3 and supply the electrical signal to an electronic control unit (which will be hereinafter referred to as "ECU") 5.

An auxiliary air passage 17 bypassing the throttle valve 3 is connected to the intake pipe 2. The auxiliary air passage 17 is provided with an auxiliary air control valve 18 for controlling an auxiliary air amount. The auxiliary air control valve 18 is connected to the ECU 5, and its valve opening amount is controlled by the ECU 5.

A fuel injection valve 6 is provided for each cylinder so as to inject fuel into the intake pipe 2. Thus, four fuel injection valves 6 would be respectively provided for a four cylinder engine. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature)

TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) by a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

Each cylinder of the engine 1 is provided with a spark plug 11. The spark plug 11 is connected to the ECU 5, and a drive signal for the spark plug 11, i.e., an ignition signal, is supplied from the ECU 5 to the spark plug An exhaust pipe 12 of the engine 1 is provided with a three-way catalyst 16 for removing components such as HC, CO, and NOx in exhaust gases. A proportional type air-fuel ratio sensor (which will be hereinafter referred to as "LAF sensor") 14 is mounted on the exhaust pipe 12 at a position upstream of the three-way catalyst 16. The LAF sensor 14 outputs a detection signal substantially proportional to the oxygen concentration (air-fuel ratio) in the exhaust gases, and supplies the detection signal to the ECU 5.

A vehicle speed sensor 21 for detecting a running speed (vehicle speed) VP of a vehicle driven by the engine 1 is connected to the ECU 5. An atmospheric pressure sensor 22 for detecting an atmospheric pressure PA is also connected to the ECU 5. A shift position sensor 23 for detecting a shift position of an automatic transmission in the vehicle is also connected to the ECU 5. Detection signals output from these sensors 21, 22, and 23 are supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values. ECU 5 also includes a central processing unit (which will be hereinafter referred to as "CPU") 5b and storage means 5c. Storage means 5c preliminary stores various operational programs to be executed by the CPU 5b and stores the results of computation or the like made by the CPU 5b. Additionally, ECU5 includes an output circuit 5d for supplying drive signals to the fuel injection valves 6, the spark plugs 11, etc.

The CPU 5b determines various engine operating conditions according to various engine parameter signals as mentioned above, and calculates a fuel injection period TOUT for each fuel injection valve 6 to be opened in synchronism with the TDC signal pulse, in accordance with Eq. (1) and according to the above determined engine operating conditions.

$$TOUT = TI \times KCMD \times KLAF \times K1 + K2 \qquad (1)$$

TI is a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. Accordingly, the basic fuel injection period TI has values proportional to an intake air amount per unit time. Thus, an accumulated intake air amount parameter GAIRSUM to be hereinafter described can be obtained by accumulating the basic fuel injection period TI.

KCMD is a target air-fuel ratio coefficient, which is set according to engine operational parameters such as the engine rotational speed NE, the absolute intake pressure PBA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is also referred to as a target equivalent ratio.

KLAF is an air-fuel ratio correction coefficient calculated by PID control so that a detected equivalent ratio KACT calculated from a detected value output from the LAF sensor 14 becomes equal to the target equivalent ratio KCMD.

The CPU 5b further calculates an ignition timing IGLOG in accordance with Eq. (2).

$$IGLOG = IGMAP + IGCR + IGFPI \qquad (2)$$

IGMAP is a basic value of the ignition timing obtained by retrieving an IG map set according to the engine rotational speed NE and the absolute intake pressure PBA. The ignition timing is indicated by an advance amount from a top dead center.

IGFPI is a retard correction term set to a negative value so that the engine rotational speed NE becomes equal to a target rotational speed NEFIR in executing rapid warm-up retard control during warming up of the engine 1.

IGCR is a correction term other than the retard correction term IGFPI. (IGMAP+IGCR) corresponds to an ignition timing in the case of normal control without the execution of the rapid warm-up retard control.

In the following description, an operational mode in which the rapid warm-up retard control is executed will be referred to as "FIRE mode".

The CPU 5b supplies a signal for driving each fuel injection valve 6 according to the fuel injection period TOUT obtained above to each fuel injection valve 6, and also supplies a signal for driving each spark plug 11 according to the ignition timing IGLOG obtained above. Further, the CPU 5b calculates a valve opening control amount ICMD for controlling the valve opening amount of the auxiliary air control valve 18 according to engine operating conditions, and supplies a drive signal corresponding to the valve opening control amount ICMD calculated above to the auxiliary air control valve 18. In the FIRE mode (and in a transient state immediately after the end of the FIRE mode), the CPU 5b calculates the valve opening control amount ICMD in accordance with Eq. (3). The amount of air supplied through the auxiliary air control valve 18 into the engine 1 is proportional to the valve opening control amount ICMD.

$$ICMD=(IFIR+ILOAD) \times KIPA+IPA \quad (3)$$

IFIR is a FIRE mode control term used in the FIRE mode (and in the transient state immediately after the end of the FIRE mode). ILOAD is a load correction term set according to whether various loads such as an electrical load, a compressor load of an air conditioner, and a power steering load on the engine 1 are ON or OFF or whether or not the automatic transmission is in an in-gear condition.

KIPA and IPA are an atmospheric pressure correction coefficient and an atmospheric pressure correction term both set according to the atmospheric pressure PA, respectively.

Figure 2:
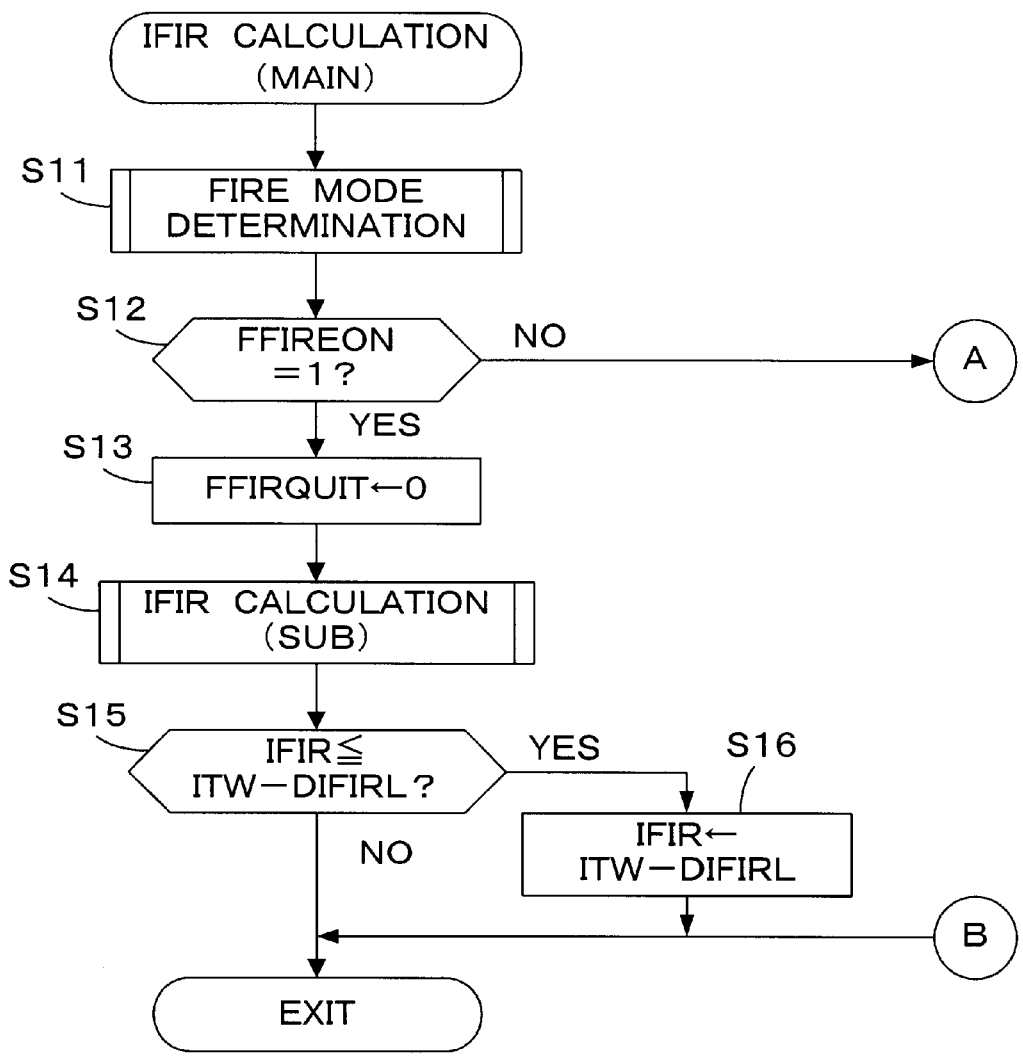
FIG. 2 is a flowchart of a portion of a main routine for calculating a control amount (IFIR) for an auxiliary air control valve.
Figure 3:
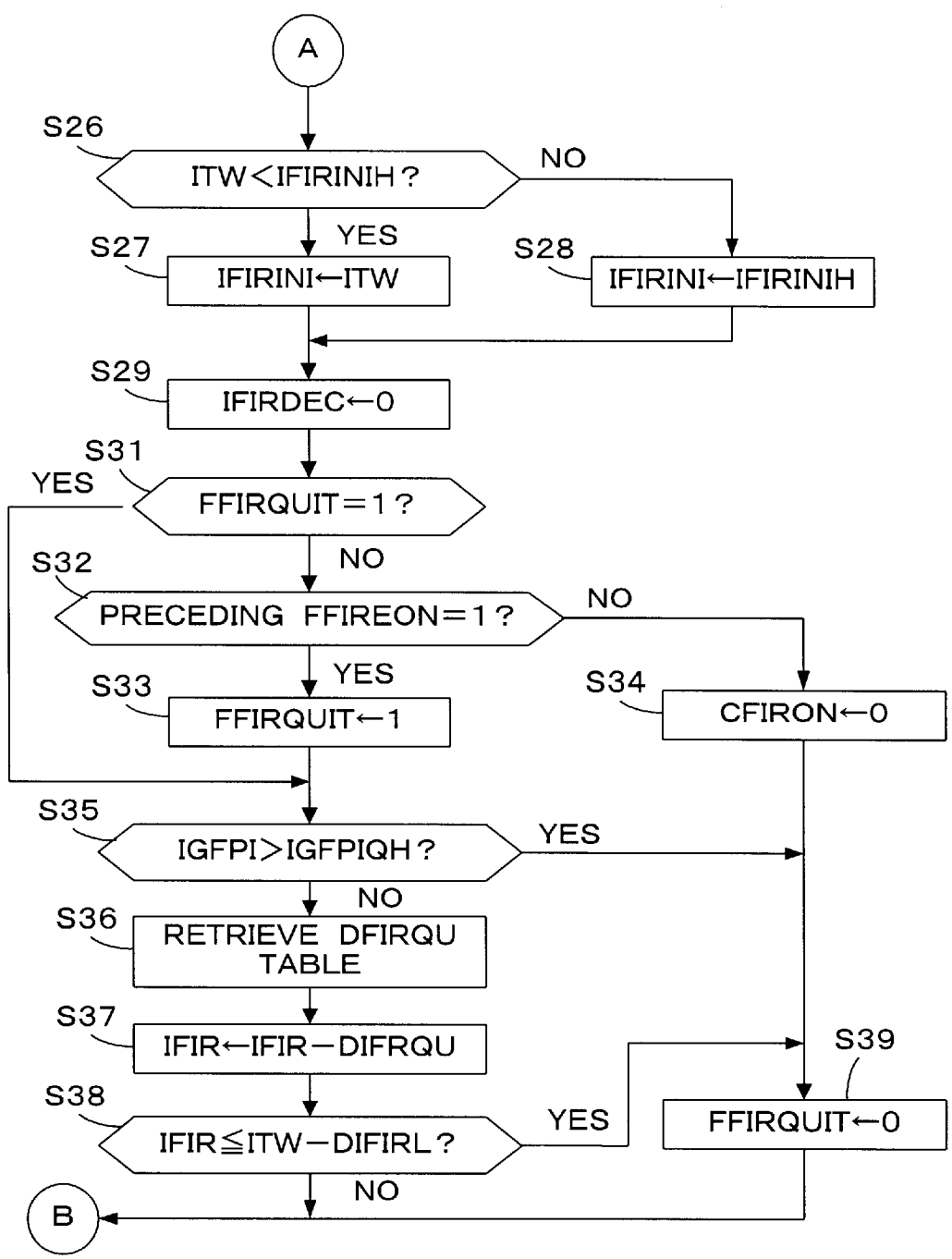
FIG. 3 is a flowchart of another portion of the main routine for calculating the control amount (IFIR) for the auxiliary air control valve.

FIGS. 2 and 3 are flowcharts showing a main routine for calculation of the FIRE mode control term IFIR in the FIRE mode and immediately after the end of the FIRE mode. This routine is executed in synchronism with the generation of a TDC signal pulse in the CPU 5b.

Figure 5:
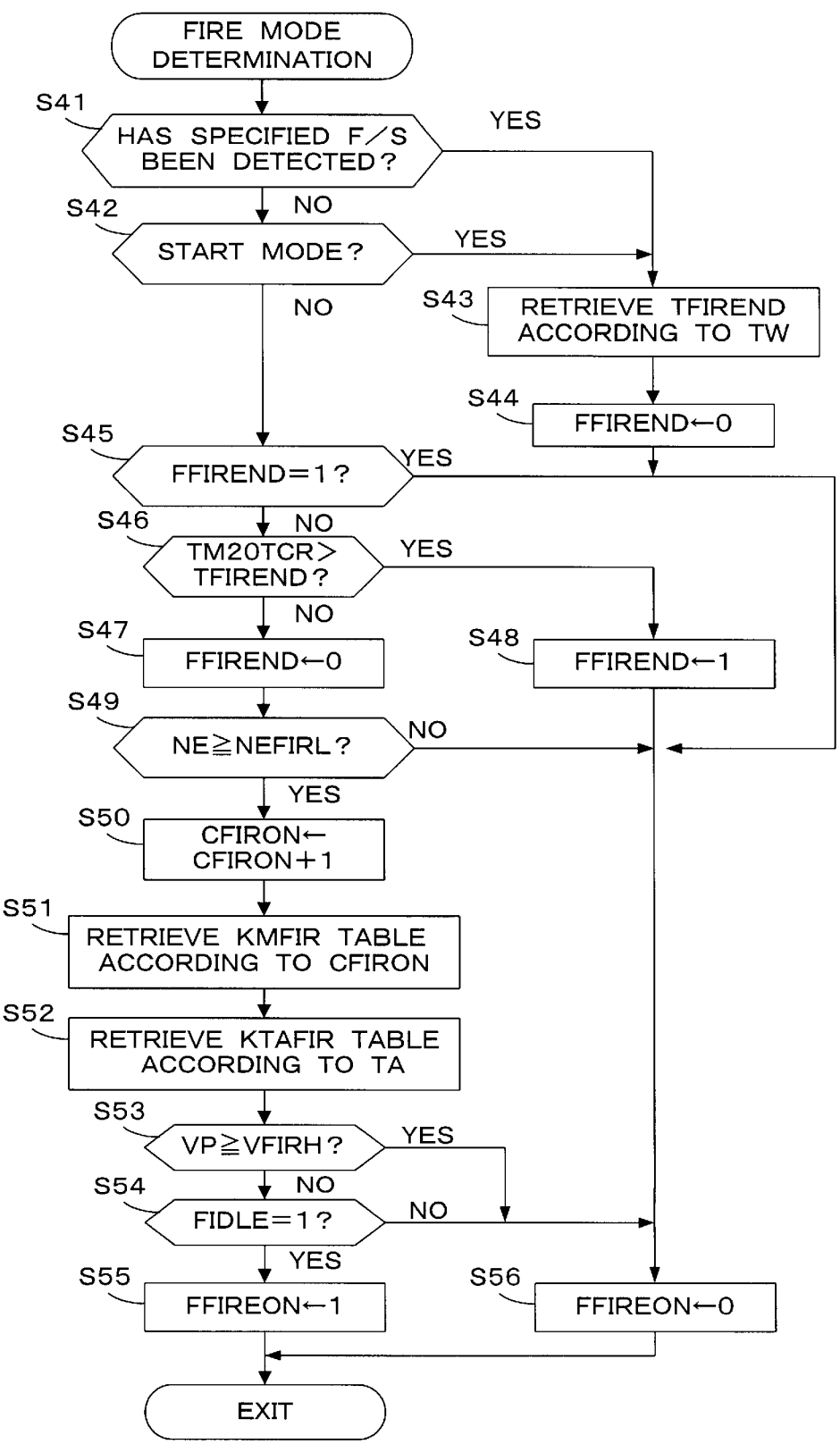
FIG. 5 is a flowchart of the process for determining whether or not catalyst temperature rise accelerating control is executed.

In step S11, FIRE mode determination processing shown in FIG. 5 is executed. The FIRE mode determination processing includes steps of setting a FIRE mode flag FFIREON to "1", indicating permission to transition to the FIRE mode or continuation of the FIRE mode.

Figure 7:
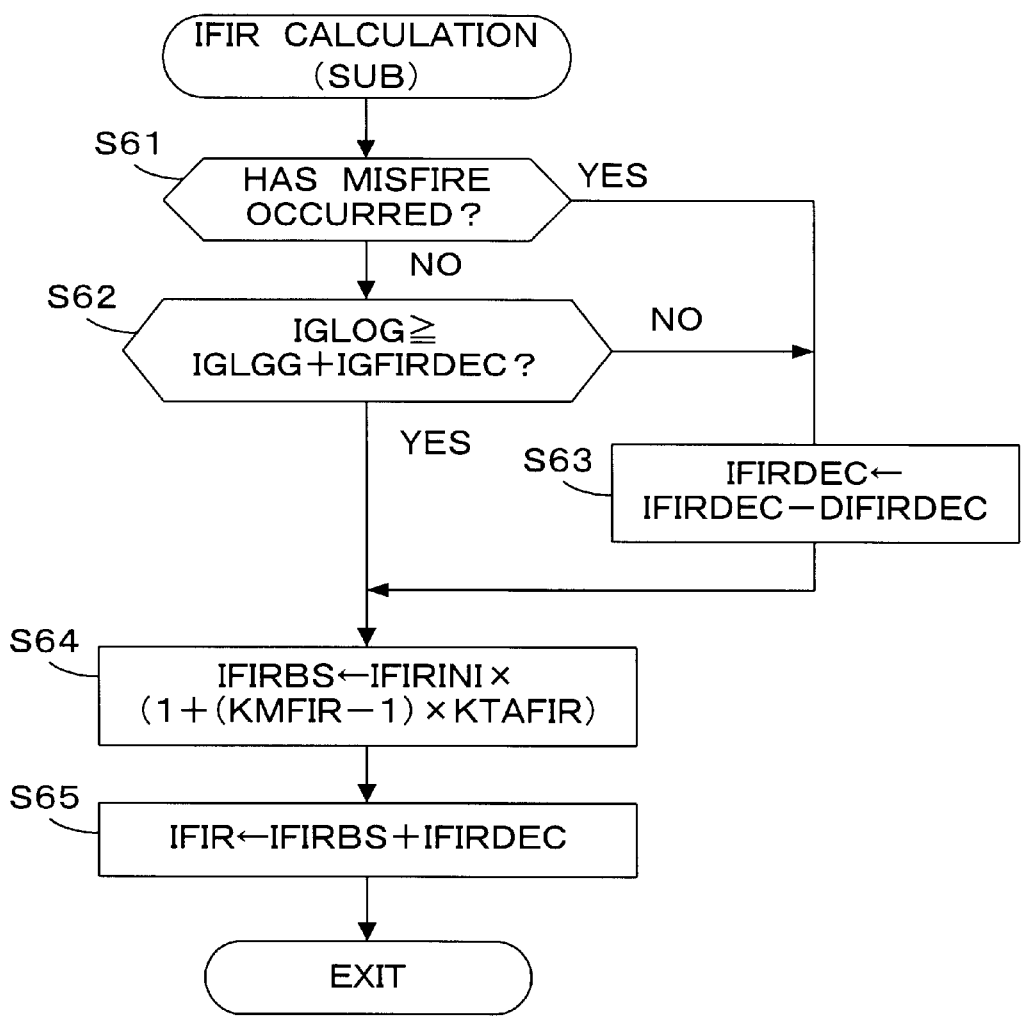
FIG. 7 is a flowchart of a subroutine for calculating the control amount (IFIR) for the auxiliary air control valve.

In step S12, it is determined whether or not the FIRE mode flag FFIREON is "1". If FFIREON is "0", which indicates that the transition to the FIRE mode or the continuation of the FIRE mode is not allowed, then the program proceeds to step S26 (FIG. 3). When FFIREON is "1", a transient control flag FFIRQUIT is set to "0" (step S13), and an IFIR calculation subroutine shown in FIG. 7 is executed (step S14). The transient control flag FFIRQUIT of "1" indicates the duration of execution of transient control immediately after the end of the FIRE mode. Thereafter, it is determined whether or not the FIRE mode control term IFIR calculated in step S14 is less than or equal to a lower limit obtained by subtracting DIFIRL from ITW. DIFIRL is a predetermined value for lower limit setting (e.g., a value corresponding to an air amount of 100 liters/min). ITW is an engine coolant temperature control term set according to the engine coolant temperature TW. The engine coolant temperature control term ITW is a control term used for control of the auxiliary air control valve 18 in an engine operating condition such as an idling operation other than the FIRE mode (step S15). If IFIR is greater than ITW minus DIFIRL, the program is ended. When IFIR is less than or equal to ITW minus DIFIRL, the FIRE mode control term IFIR is set to the lower limit (ITW-DIFIRL) (step S16) and the program is then ended.

In step S26 shown in FIG. 3, it is determined whether or not the engine coolant temperature control term ITW is less than an upper limit initial value IFIRINIH (e.g., a value corresponding to an intake air amount of 600 liters/min). If ITW is less than IFIRINIH, an initial value IFIRINI, used in step S64 shown in FIG. 7, is set to the engine coolant temperature control term ITW (step S27). When ITW is greater than or equal to IFIRINIH, the initial value IFIRINI is set to the upper limit initial value IFIRINIH (step S28).

In step S29, a subtraction correction value IFIRDEC, updated in step S63 and used in step S65 both shown in FIG. 7, is set to "0". Thereafter, it is determined whether or not the transient control flag FFIRQUIT is "1" (step S31). If FFIRQUIT is "1", which indicates that the transient control is being performed, the program proceeds directly to step S35. If FFIRQUIT is "0", which indicates that the transient control is not being performed, it is determined whether or not the FIRE mode flag FFIREON was "1" at the preceding cycle (at the preceding execution of this processing) (step S32). If the preceding FFIREON was "1", which indicates a condition immediately after the end of the FIRE mode, the transient control flag FFIRQUIT is set to "1" (step S33), and the program proceeds to step S35.

If the preceding FFIREON was 0 in step S32, a FIRE mode on-counter CFIRON is set to "0" (step S34), and the transient control flag FFIRQUIT is set to "0" (step S39). CFIRON is a counter tht is incremented in step S50 shown in FIG. 5 to count the number of repetitions of the FIRE mode. Then, the program is ended.

In step S35, it is determined whether or not the retard correction term IGFPI of the ignition timing IGLOG is greater than a threshold IGFPIQH (e.g., −3 deg) for determination of ending of the transient control. If IGFPI is greater than IGFPIQH, which indicates that the absolute value of the retard correction term IGFPI is small (the retard amount is small), the program proceeds to step S39, so as to end the transient control.

Figure 4:
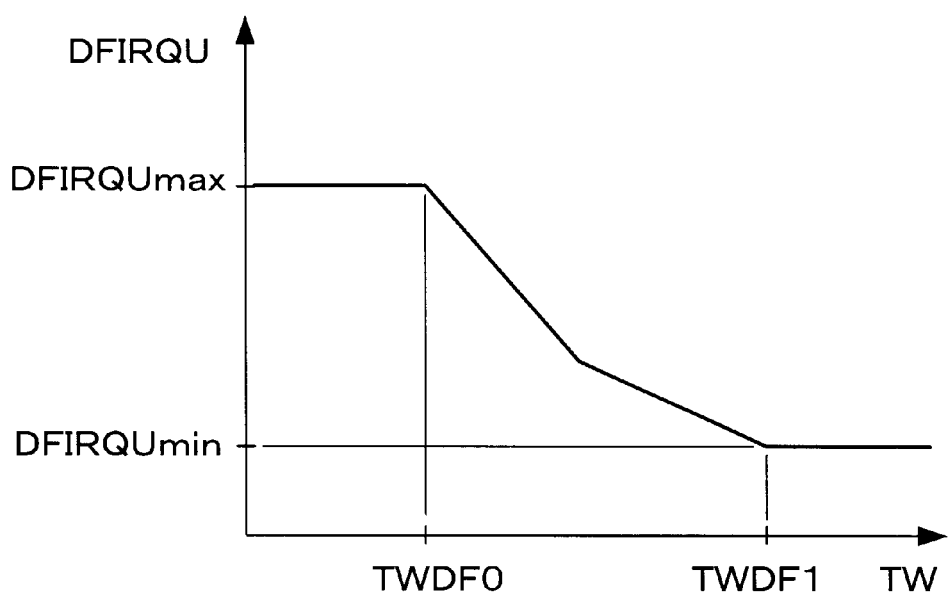
FIG. 4 is a diagram showing a table used by the processing shown in FIG. 3.

If IGFPI is less than or equal to IGFPIQH in step S35, a DFIRQU table shown in FIG. 4 is retrieved according to the engine coolant temperature TW to calculate a transient control subtraction value DFIRQU (step S36). The DFIRQU table is set so that the transient control subtraction value DFIRQU decreases with an increase in the engine coolant temperature TW. In FIG. 4, DFIRQUmax and DFIRQUmin are set to a value corresponding to an intake air amount of 5 liters/min and a value corresponding to an intake air amount of 2 liters/min, respectively, for example, and TWDF0 and TWDF1 are set to 28 degrees Centigrade and 62 degrees Centigrade, respectively, for example.

In step S37, the FIRE mode control term IFIR is decremented by the transient control subtraction value DFIRQU. Thereafter, it is determined whether or not the FIRE mode control term IFIR is less than or equal to the lower limit obtained by subtracting the predetermined value DIFIRL from the engine coolant temperature control term ITW (step S38). If IFIR is greater than ITW minus DIFIRL, the program is ended. When IFIR is less than or equal to ITW minus DIFIRL, step S39 is executed and the program is then ended.

As mentioned above, the processing shown in FIG. 3 executes the steps of setting the initial value IFIRINI of the FIRE mode control term IFIR (steps S26 to S28), the steps of the transient control immediately after the end of the FIRE mode (steps S31 to S38), and the steps of initialization of the parameters used in the control to be hereinafter described (steps S29 and S34). By executing the transient control, the intake air amount increased in the FIRE mode is gradually returned to a value in the normal control.

Figure 6A:
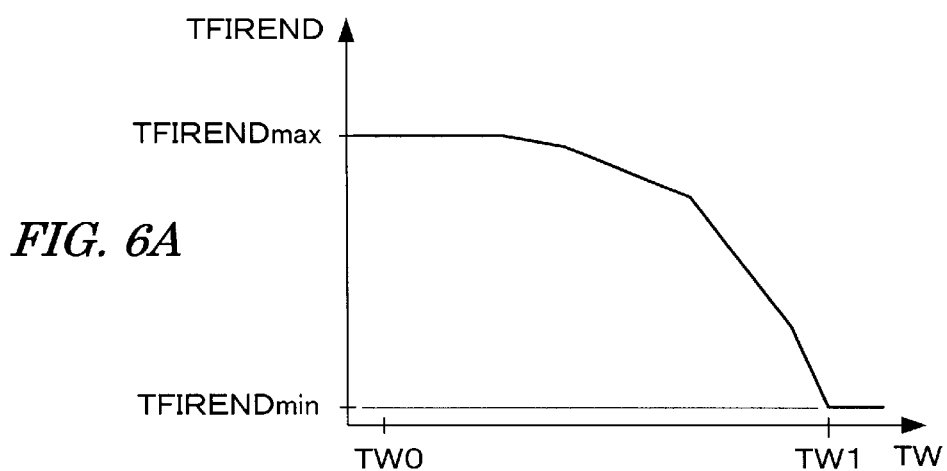
FIGS. 6A, 6B and 6C are diagrams showing tables used by the process shown in FIGS. 5.

FIG. 5 is a flowchart showing the FIRE mode determination processing executed in step S11 shown in FIG. 2. In step S41, it is determined whether or not a specified failure has already been detected. If the specified failure has not been detected, it is determined whether or not the engine 1 is at starting (at cranking) (step S42). If the answer to either step S41 or S42 is affirmative (YES), a TFIREND table shown in FIG. 6A is retrieved according to the engine coolant temperature TW to determine a FIRE mode end time TFIREND referred in step S46 to be hereinafter described (step S43). The TFIREND table is set so that the FIRE mode end time TFIREND decreases with an increase in the engine coolant temperature TW. In FIG. 6A, TFIRENDmax and TFIRENDmin are set to 50 seconds and 2 seconds, respectively, for example, and TW0 and TW1 are set to −10 degrees Centigrade and 75 degrees Centigrade, respectively, for example.

In step S44, an end flag FFIREND is set to "0", a value of "1" indicates the ending of the FIRE mode. Thereafter, the FIRE mode flag FFIREON is set to "0" (step S56), and the program is ended.

If the answers to steps S41 and S42 are both negative (NO), it is determined whether or not the end flag FFIREND is "1" (step S45). If FFIREND is "1", the program proceeds directly to step S56. When FFIREND is "0", the value of an upcount timer TM20TCR is compared to the FIRE mode end time TFIREND calculated in step S43 (step S46). Upcount timer TM20TCR is started when engine 1 is started (when cranking is finished) and measures the elapsed time since engine 1 started. When TM20TCR is greater than TFIREND, the end flag FFIREND is set to "1", so as to end the FIRE mode (step S48), and the program proceeds to step S56.

Figure 6B:
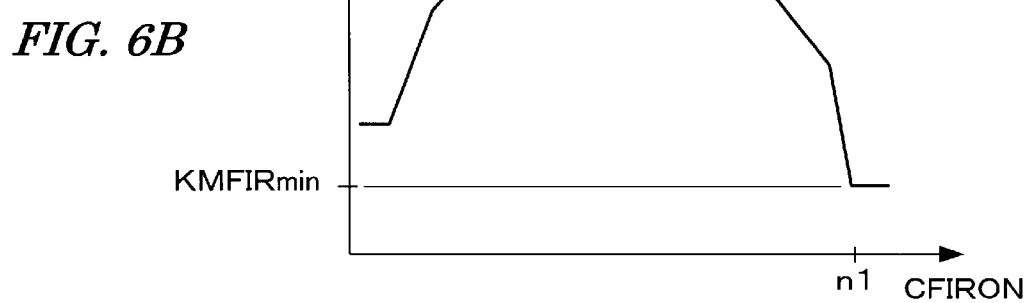

If TM20TCR is less than or equal to TFIREND in step S46, the end flag FFIREND is set to "0" (step S47), and it is determined whether or not the engine rotational speed NE is greater than or equal to a predetermined lower limit rotational speed NEFIRL (e.g., 700 rpm) (step S49). If NE is less than NEFIRL, the program proceeds to step S56. When NE is greater than or equal to NEFIRL, the FIRE mode on-counter CFIRON is incremented by "1" (step S50). Then a KMFIR table shown in FIG. 6B is retrieved according to the value of the counter CFIRON to calculate a continuation time correction coefficient KMFIR used in the processing shown in FIG. 7 (step S51). The KMFIR table is set so that the correction coefficient KMFIR initially increases with an increase in the value of the counter CFIRON and after KMFIR reaching a maximum value, KMFIR may decrease with a further increase in the value of the counter CFIRON. In FIG. 6B, KMFIRmax and KMFIRmin are set to 2.625 and 1.0, respectively, for example, and n1 is set to 2000, for example.

Figure 6C:
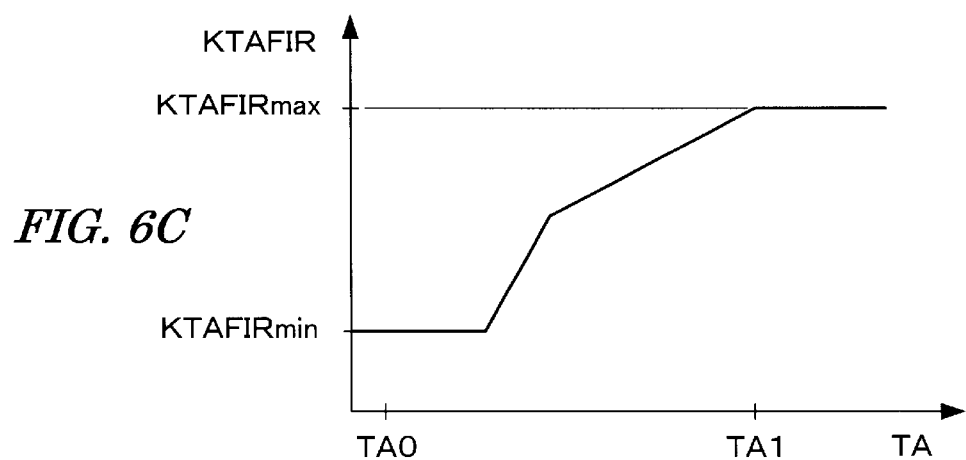

In step S52, a KTAFIR table shown in FIG. 6C is retrieved according to the intake air temperature TA to calculate an intake air temperature correction coefficient KTAFIR used in the processing shown in FIG. 7. The KTAFIR table is set so that the correction coefficient KTAFIR increases with an increase in the intake air temperature TA. In FIG. 6C, KTAFIRmax and KTAFIRmin are set to 2.0 and 1.0, respectively, for example, and TA0 and TA1 are set to −10 degrees Centigrade and 80 degrees Centigrade, respectively, for example.

In step S53, it is determined whether or not the vehicle speed VP is greater than or equal to a predetermined vehicle speed VFIRH (e.g., 5 km/h). If VP is less than VFIRH, it is determined whether or not an idle flag FIDLE is "1", this flag set to "1" indicates that engine 1 is idling (step S54). If VP is greater than or equal to VFIRH, which indicates that the vehicle is running, or if FIDLE is "0", which indicates that the engine 1 is not in the idling condition, the program proceeds to step S56, in which the FIRE mode flag FFIREON is set to "0". On the other hand, if VP is less than VFIRH and the engine 1 is in the idling condition, the FIRE mode flag FFIREON is set to "1" (step S55), and the program is then ended.

FIG. 7 is a flowchart showing the IFIR calculation subroutine of step S14 shown in FIG. 2. In step S61, it is determined whether or not the occurrence of misfire has been detected. The occurrence of misfire is detected by a known method according to fluctuations in period of generation of the CRK signal pulse which is generated at every crank angle of 30 deg. When the occurrence of misfire has not been detected, it is determined whether or not the ignition timing IGLOG is greater than or equal to a value obtained by adding a sticking determination value IGFIRDEC (e.g., 1 deg) and a lower limit IGLGG (e.g., −20 deg) (step S62). When the occurrence of misfire has not been detected and IGLOG is greater than or equal to the sum of IGLGG and IGFIRDEC, the program proceeds to step S64. If the occurrence of misfire has been detected or IGLOG is less than the sum of IGLGG and IGFIRDEC, which indicates that the ignition timing IGLOG sticks to a value in the vicinity of the lower limit IGLGG, a subtraction correction value IFIRDEC (<0) used in step S65 is decremented by a predetermined amount DIFIRDEC (step S63), and the program next proceeds to step S64.

In step S64, a basic value IFIRBS of the FIRE mode control term IFIR is calculated in accordance with Eq. (4).

$$IFIRBS = IFIRINI \times [1 + (KMFIR - 1) \times KTAFIR] \qquad (4)$$

KMFIR and KTAFIR are the continuation time correction coefficient and the intake air temperature correction coefficient calculated in steps S51 and S52 shown in FIG. 5, respectively. The continuation time correction coefficient KMFIR changes with time elapsed from the start of the FIRE mode (an increase in the value of the counter CFIRON) as shown in FIG. 6B, so that the intake air amount is basically controlled so as to gradually increase from the start of the FIRE mode, subsequently gradually decrease, and subsequently maintain a substantially constant value (see FIG. 15A).

IFIRINI is the initial value set in step S27 or S28 shown in FIG. 3.

In step S65, the subtraction correction value IFIRDEC updated in step S63 is added to the basic value IFIRBS calculated in step S64 to calculate the FIRE mode control term IFIR. By adding the subtraction correction value IFIRDEC (<0), the intake air amount decreases when a misfire is detected or when the ignition timing IGLOG sticks to a value in the vicinity of the lower limit. Thereby avoiding the possibility that the discharge of unburned fuel may increase or that the retard correction of the ignition timing IGLOG may become impossible (the engine rotational speed NE cannot be made equal to the target rotational speed NEFIR).

Figure 8:
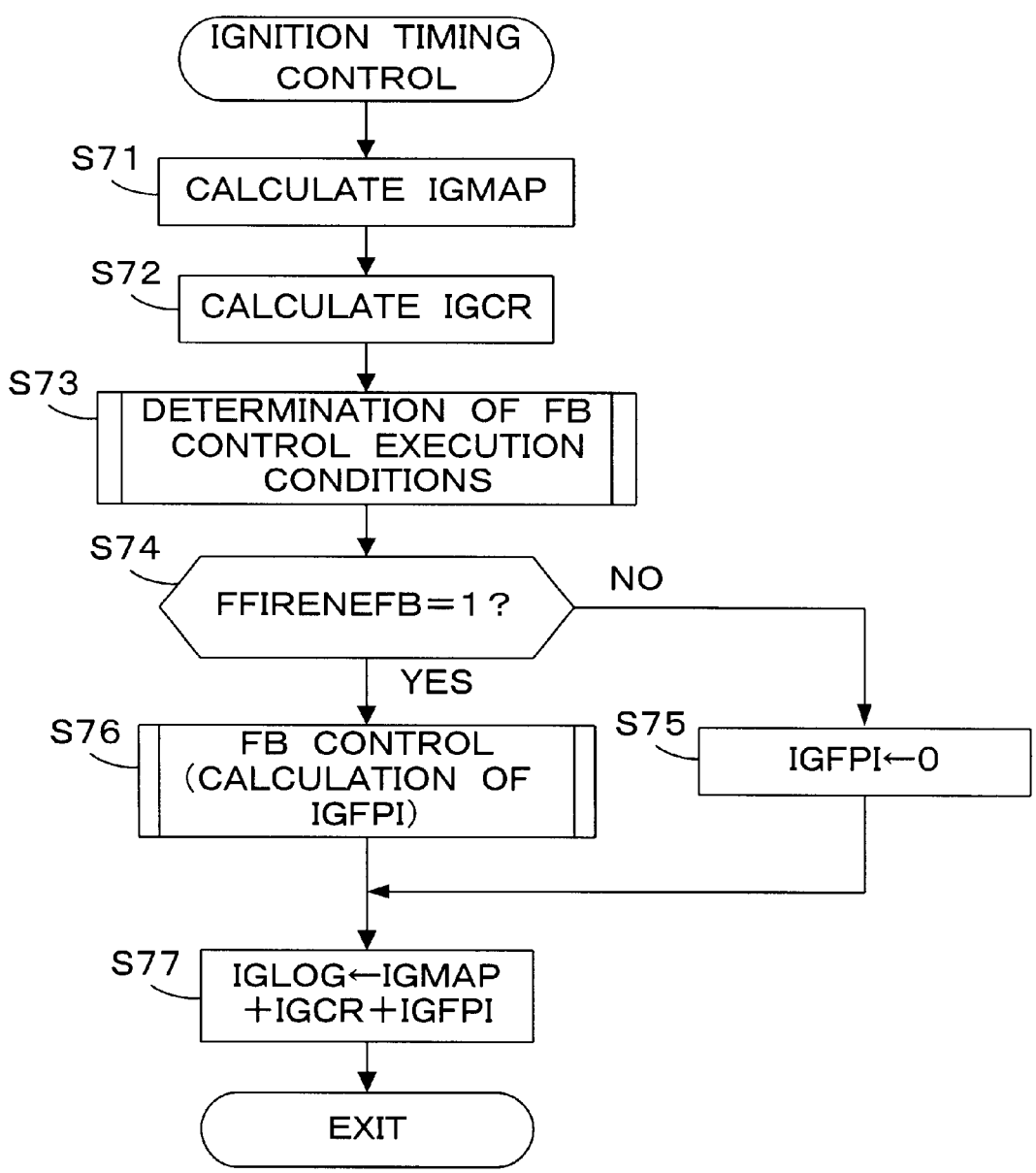
FIG. 8 is a flow chart of a main routine for executing ignition timing control.

FIG. 8 is a flowchart showing ignition timing control processing, and this processing is executed in synchronism with the generation of a TDC signal pulse in the CPU 5b.

Figure 9:
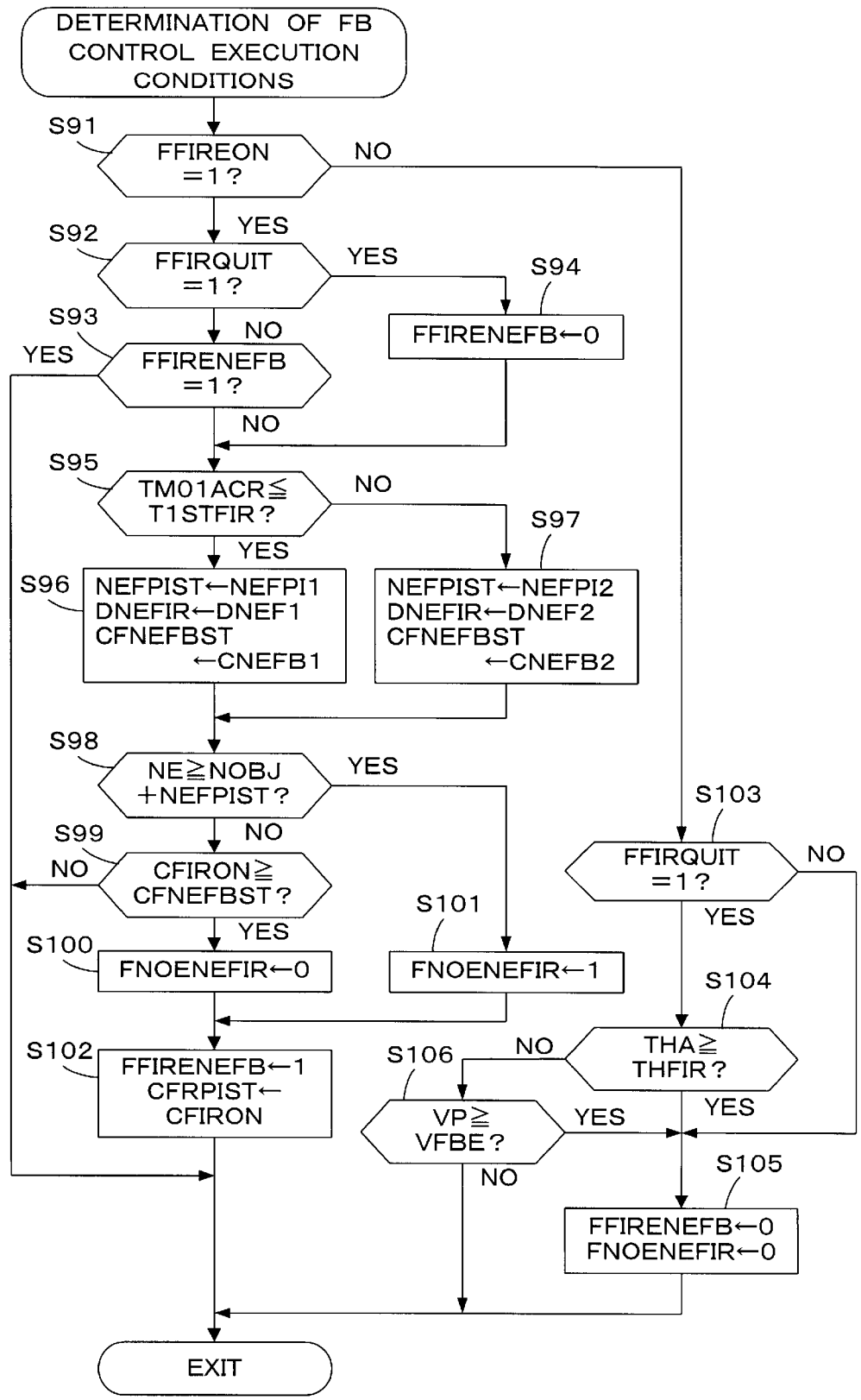
FIG. 9 is a flowchart of the process for determining an executing condition for executing feedback control for controlling ignition timing.

In step S71, a basic ignition timing IGMAP is calculated according to the engine rotational speed NE and the absolute intake pressure PBA. Thereafter, a correction term IGCR other than the retard correction term IGFPI is calculated (step S72). In step S73, a processing of determination of feedback (FB) control execution conditions, which is shown in FIG. 9, is executed. This processing is performed to determine execution conditions of feedback control for controlling the ignition timing so that the detected engine rotational speed NE coincides with the target rotational speed NEFIR for the FIRE mode. If the execution conditions are satisfied, a feedback control flag FFIRENEFB is set to "1".

In step S74, it is determined whether or not the feedback control flag FFIRENEFB is "1". If FFIRENEFB is "0", the retard correction term IGFPI is set to "0" (step S75). When FFIRENEFB is "1", which indicates that the execution conditions are satisfied, the feedback control is executed to set the retard correction term IGFPI according to the engine rotational speed NE (step S76).

In step S77, the ignition timing IGLOG is calculated in accordance with Eq. (2) mentioned above. Then, the program is ended.

FIG. 9 is a flowchart showing the processing for determination of the FB control execution conditions executed in step S73 shown in FIG. 8. In step S91, it is determined whether or not the FIRE mode flag FFIREON is "1". If FFIREON is "0", which indicates that the FIRE mode is off, it is determined whether or not the transient control flag FFIRQUIT is "1" (step S103). When FFIRQUIT is "0", which indicates that the transient control is off, both the feedback control flag FFIRENEFB and a target rotational speed flag FNOENEFIR are set to "0" (Step 105). If the target rotational speed flag FNOENEFIR's "1", this indicates that there was no increase in the target rotational speed during the feedback control (see step S131 in FIG. 12). Then, the program is ended.

If FFIRQUIT is "1" in step S103, which indicates that the transient control is on, it is determined whether or not the throttle valve opening THA is greater than or equal to a predetermined opening THFIR (e.g., 0.88 deg)(step S104). If THA is less than THFIR, which indicates that the throttle valve is substantially fully closed, it is determined whether or not the vehicle speed VP is higher than or equal to a second predetermined vehicle speed VFBE (e.g., 10 km/h) which is higher than the first predetermined vehicle speed VFIRH (step S106). If VP is less than VFBE, the program is ended at once. If THA is greater than or equal to THFIR or VP is greater than or equal to VFBE, the program proceeds to step S105.

When the program proceeds from step S104 to step S105 and is then ended at once, the feedback control frag FFIRENEFB is kept "1", even if the FIRE mode flag FFIREON is "0", and the feedback control is continued. When the vehicle speed VP reaches the predetermined vehicle speed VFBE in the state in which the throttle valve 3 is substantially full closed (that is, by creeping), or when the throttle valve 3 is opened, the feedback control flag FFIRENEFB is returned to "0", and the feedback control is ended.

If FFIREON is "1" in step S91, it is determined whether or not the transient control flag FFIRQUIT is "1" (step S92). If FFIRQUIT is "1", the feedback control flag FFIRENEFB is set to "0" (step S94), and the program proceeds to step S95. If FFIRQUIT is "0", it is determined whether or not the feedback control flag FFIRENEFB has already been set to "1" (step S93). If FFIRENEFB is "1", the program is ended. When FFIRENEFB is "0", the program proceeds to step S95.

In step S95, it is determined whether or not the value of an upcount timer TM01ACR is less than or equal to a predetermined time T1STFIR (e.g., 1 msec). If TM01ACR is less than or equal to T1STFIR, which indicates that the engine 1 has just started, an addition value NEFPIST for feedback control start determination, an addition value DNEFIR for target rotational speed correction, and a count value CFNEFBST for feedback control start determination are set to first values NEFPI1 (e.g., 200 rpm), DNEF1 (e.g., 1 rpm), and CFNEFB1 (e.g., 200), respectively (step S96). When TM01ACR is greater than T1STFIR, the addition value NEFPIST, the addition value DNEFIR, and the count value CFNEFBST are set to second values NEFPI2 (e.g., 200 rpm), DNEF2 (e.g., 12 rpm), and CFNEFB2 (e.g., 2), respectively (step S97).

In step S98, it is determined whether or not the engine rotational speed NE is higher than or equal to a value obtained by adding the addition value NEFPIST for feedback control start determination and a target rotational speed NOBJ for the normal control. If NE is less than the sum of NOBJ and NEFPIST, it is determined whether or not the value of the FIRE mode on-counter CFIRON is greater than or equal to the count value CFNEFBST for feedback control start determination (step S99). When the answers to steps S98 and S99 are both negative (NO), which indicates that the engine rotational speed NE is low and the FIRE mode continuation time is short, the feedback control is not executed and the program is accordingly ended.

If NE is greater than or equal to the sum of NOBJ and NEFPIST in step S98, the target rotational speed flag FNOENEFIR is set to "1" (step S101). When CFIRON is greater than or equal to CFNEFBST in step S99, the target rotational speed flag FNOENEFIR is set to "0" (step S100). After executing step S101 or S100, the program proceeds to step S102. Accordingly, if the engine rotational speed NE at starting the feedback control is high (NE is greater than or equal to (NOBJ+NEFPIST)), a target rotational speed addition value ENEFIR used for calculation of the target rotational speed NEFIR for the FIRE mode is set to "0" (see FIG. 12 and steps S117 and S118 in FIG. 10).

In step S102, the feedback control flag FFIRENEFB is set to "1", and the value of the FIRE mode on-counter CFIRON is stored as a stored value CFRPIST.

Figure 10:
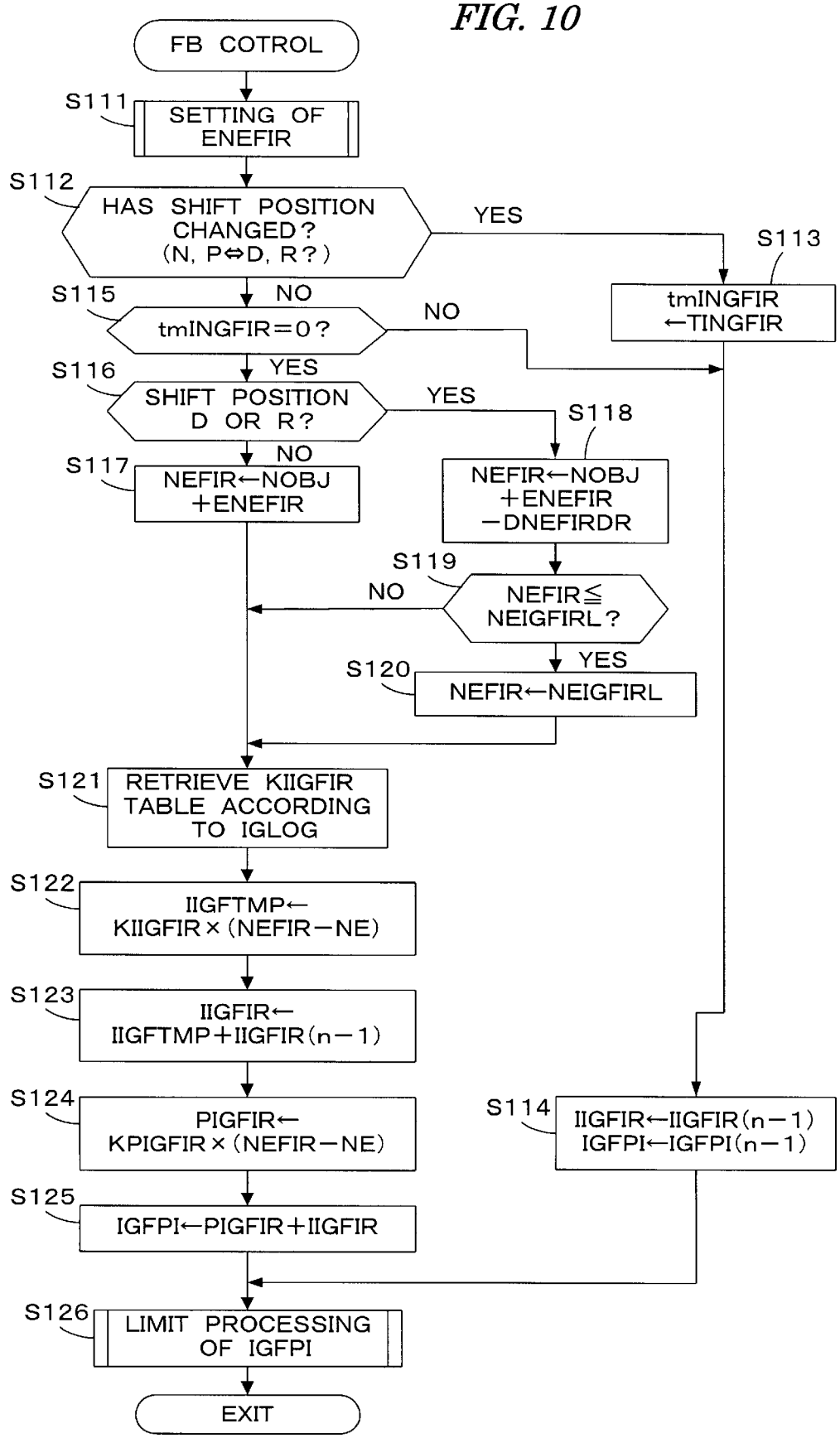
FIG. 10 is a flowchart of the process for executing the feedback control for controlling ignition timing.

FIG. 10 is a flowchart showing the feedback control processing executed in step S76 shown in FIG. 8. In step S111, the process of setting the target rotational speed addition value ENEFIR (FIG. 12) is executed to set the addition value ENEFIR.

In step S112, it is determined whether or not the shift position SFT of the automatic transmission has been changed from a neutral position N or a parking position P to a drive position D or a reverse position R (in-gear condition) or vice versa. If the shift position has been changed, a predetermined time TINGFIR (e.g., 3 seconds) is set to a downcount timer tmINGFIR referred in step S115, and the downcount timer tmINGFIR is started (step S113). Thereafter, the preceding values of both an integral term IIGFIR(n−1) and a retard correction term IGFPI(n−1) in the feedback control are held as present values IIGFIR and IGFPI (step S114) and the program goes to step S126.

If the shift position has not been changed in step S112, it is determined whether or not the value of the timer tmING-FIR started in step S113 is "0" (step S115). If tmINGFIR is greater than 0, the program proceeds to step S114. If tmINGFIR is equal to 0, it is determined whether or not the shift position SFT is the drive position D or the reverse position R (in-gear condition) (step S116). When the shift position SFT is not in the in-gear condition, the target rotational speed NEFIR is calculated in accordance with Eq. (5) (step S117), and the program proceeds to step S121.

$$NEFIR=NOBJ+ENEFIR \qquad (5)$$

NOBJ is the target rotational speed at idling in a normal mode (other than the FIRE mode).

ENEFIR is the target rotational speed addition value calculated in step S111.

If the shift position SFT is the drive position D or the reverse position R, i.e., the shift position SFT is in the in-gear condition in step S116, the target rotational speed NEFIR is calculated in accordance with Eq. (6) (step S118).

$$NEFIR=NOBJ+ENEFIR-DNEFIRDR \qquad (6)$$

DNEFIRDR is an in-gear condition correction value set to 300 rpm, for example.

In step S119, it is determined whether or not the target rotational speed NEFIR for the FIRE mode is less than or equal to a lower limit NEIGFIRL (e.g., 730 rpm). If NEFIR is greater than NEIGFIRL, the program proceeds directly to step S121. When NEFIR is less than or equal to NEIGFIRL, the target rotational speed NEFIR is set to the lower limit NEIGFIRL (step S120), and the program next proceeds to step S121.

Figure 11:
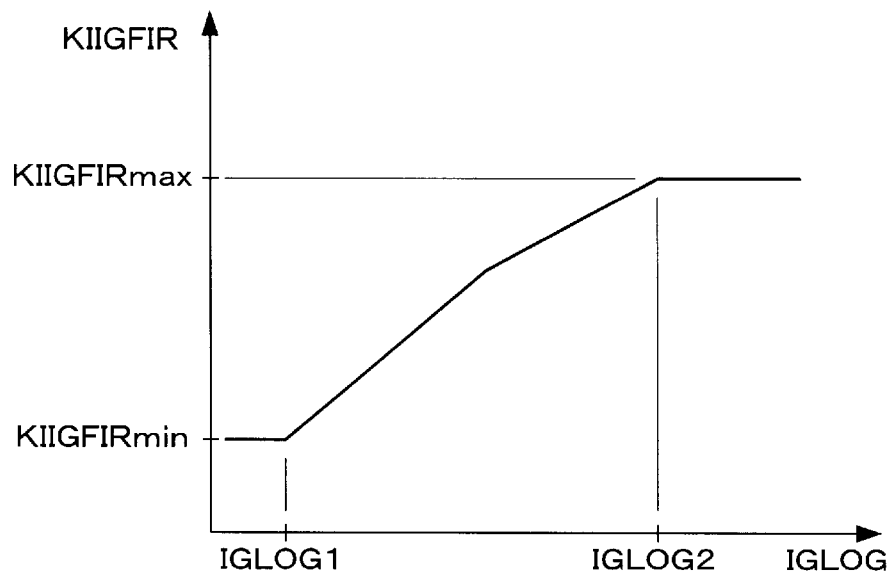
FIG. 11 is a diagram showing a table used by the process shown in FIG. 10.

In step S121, a KIIGFIR table shown in FIG. 11 is retrieved according to the ignition timing IGLOG to calculate an integral term gain KIIGFIR. The KIIGFIR table is set so that the integral term gain KIIGFIR increases with an increase (advance) in the ignition timing IGLOG. In FIG. 11, KIIGFIRmax and KIIGFIRmin are set to 0.063 and 0.016, respectively, for example, and IGLOG1 and IGLOG2 are set to −10 deg and 12 deg, respectively, for example.

In step S122, the engine rotational speed NE, the target rotational speed NEFIR for the FIRE mode, and the integral term gain KIIGFIR are applied to Eq. (7) to calculate an addition value IIGFTMP.

$$IIGFTMP = KIIGFIR \times (NEFIR-NE) \quad (7)$$

In step S123, the addition value IIGFTMP is added to the preceding value IIGFIR(n−1) of the integral term to calculate the integral term (present value) IIGFIR. Thereafter, a proportional term PIGFIR is calculated in accordance with Eq. (8) (step S124).

$$PIGFIR = KPIGFIR \times (NEFIR-NE) \quad (8)$$

Next, the retard correction term IGFPI is calculated by adding the integral term IIGFIR and the proportional term PIGFIR (step S125), and the program proceeds to step S126.

Figure 13:
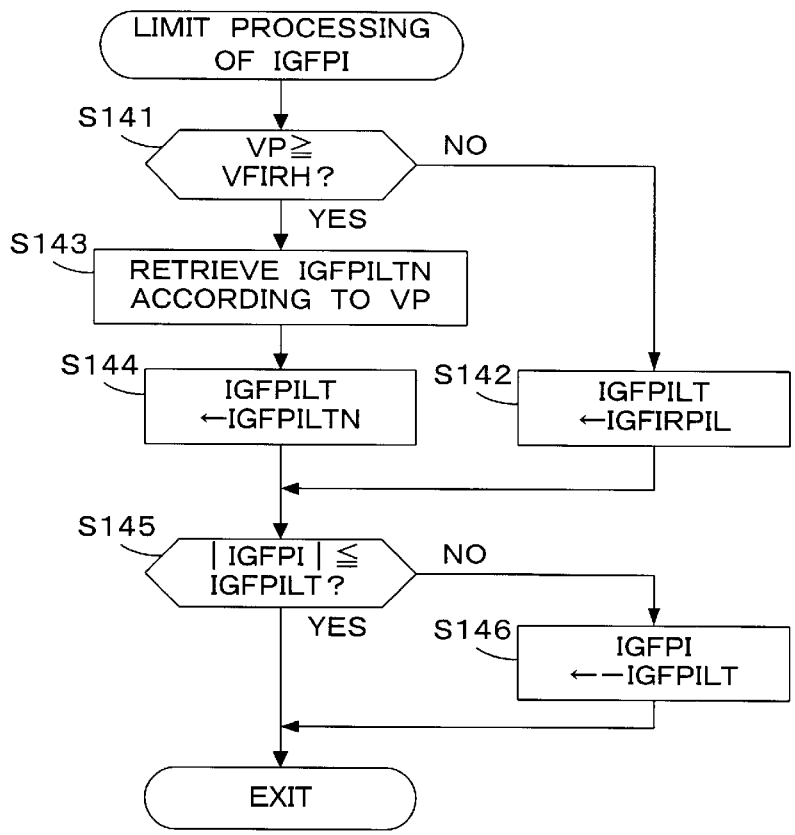
FIG. 13 is a flow chart of the process for limiting a retard correction amount (IGFPI) of the ignition timing.

In step S126, a program of limiting the retard correction term IGFPI shown in FIG. 13 is executed to set the absolute value of the retard correction term IGFPI to a retard limit value if the absolute value of the retard correction term IGFPI is greater than the retard limit value, and then the program is ended.

By the process of FIG. 10, the feedback control is executed to calculate the retard correction term IGFIR so that the engine rotational speed NE coincides with the target rotational speed NEFIR for the FIRE mode.

Figure 12:
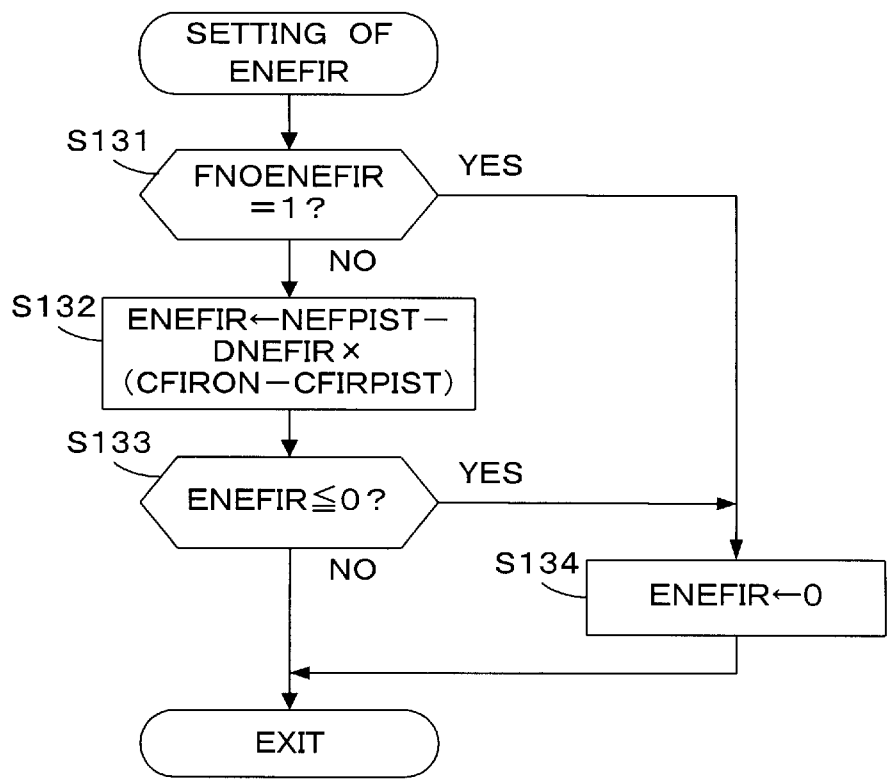
FIG. 12 is a flowchart of the process for setting an additive value (ENEFIR) for a target engine rotational speed in the catalyst temperature rise accelerating control.

FIG. 12 is a flowchart showing the process of setting ENEFIR executed in step S11 shown in FIG. 10. In step S131, it is determined whether or not the target rotational speed flag FNOENEFIR is "1". If FNOENEFIR is "1", which indicates that the target rotational speed is not to be increased, the target rotational speed addition value ENEFIR is set to "0" (step S134), and the program is ended.

If FNOENEFIR is "0", the addition value ENEFIR is calculated in accordance with Eq. (9) (step S132).

$$ENEFIR = NEFPIST - DNEFIR \times (CFIRON-CFIRPIST) \quad (9)$$

NEFPIST and DNEFIR are the addition value for feedback control start determination and the addition value for target rotational speed correction set in step S96 or S97, respectively and shown in FIG. 9. CFIRON is the value of the FIRE mode on-counter.

CFIRPIST is the value stored in step S102 shown in FIG. 9. The difference between CFIRON and CFIRPIST is a count value corresponding to the elapsed time after starting of the feedback control. Accordingly, the target rotational speed NEFIR for the FIRE mode is set so that it becomes equal to the sum of NOBJ and NEFPIST at the start of the feedback control and that it gradually decreases with elapsed time until finally reaching the target rotational speed NOBJ for the normal control according to Eq. (9) and Eq. (5) or (6) (see FIG. 15C).

In step S133, it is determined whether or not the addition value ENEFIR is less than or equal to 0. If ENEFIR is less than or equal to 0, the program proceeds to step S134. When ENEFIR is greater than 0, the program is ended.

FIG. 13 is a flowchart of the process for limiting the retard correction term IGFPI to be executed in step S126 shown in FIG. 10. In step S141, it is determined whether or not the vehicle speed VP is higher than or equal to the first predetermined vehicle speed VFIRH (see step S53 in FIG. 5). If VP is lower than VFIRH, the retard limit value IGFPILT (>0) is set to a limit value IGFIRPIL (e.g., 10 deg) for the FIRE mode (step 142), and the program proceeds to step S145.

Figure 14:
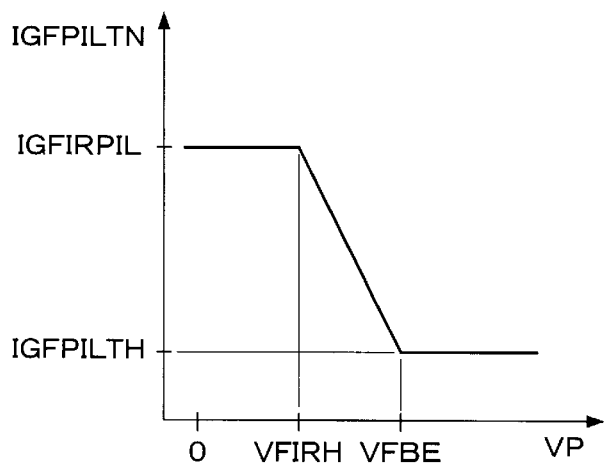
FIG. 14 is a diagram showing a table used for the process shown in FIG. 13.

If VP is higher than or equal to VFIRH in step S141 and thereby the FIRE mode flag FFIREON is returned to "0", a retard limit value IGFPILTN for the low speed running is calculated by retrieving an IGFPILTN table shown in FIG. 14 according to the vehicle speed VP (step S143). The IGFPILTN table is set so that the limit value IGFPILTN decreases (becomes a more advanced value) as the vehicle speed VP becomes higher when the vehicle speed VP is between the first predetermined vehicle speed VFIRH and a second predetermined vehicle speed VFBE (>VFIRH). The predetermined value IGFPILTH in FIG. 14 is set to 4 deg, for example.

The retard limit value IGFPILT is then set to the retard limit value IGFPILTN for low speed running (step S144), and the program proceeds to step S145.

In step S145, it is determined whether or not the absolute value of the retard correction term IGFPI is less than or equal to the retard limit value IGFPILT. If IIGFPII is less than or equal to IGFPILT, the program is ended at once, whereas if IIGFPII is greater than IGFPILT, the retard correction amount IGFPI is set to -IGFPILT (step S146), and the program is then ended.

By the process shown in FIG. 13, the retard limit value IGFPILT is set so that it decreases (becomes a more advanced value) as the vehicle speed VP becomes higher when the vehicle speed VP lies between the first predetermined vehicle speed VFIRH and the second predetermined vehicle speed VFBE, and accordingly it is possible to prevent, when the vehicle speed VP is increased by creeping and the feedback control is ended, the occurrence of a torque shock due to a rapid advance of the ignition timing IGLOG.

FIGS. 15A, 15B, and 15C are time charts for illustrating the intake air amount control and the ignition timing control. FIG. 15A shows changes in the valve opening control amount ICMD of the auxiliary air control valve 18. FIG. 15B shows changes in the ignition timing IGLOG. FIG. 15C shows changes in the engine rotational speed NE.

In the example shown in FIGS. 15A to 15C, the engine 1 is started at the time t0 (i.e., cranking is started at the time t0), and the engine 1 starts running (self sustaining operation) at the time t1. At time t1, the FIRE mode is started. After starting the FIRE mode, the engine rotational speed NE is increased, and the execution conditions of the feedback control for ignition timing are satisfied at the time t2. Consequently, feedback control is started. As mentioned above, the target rotational speed NEFIR for the FIRE mode is equal to the sum of NOBJ and NEFPIST at the beginning of the FIRE mode, and is thereafter gradually decreased to the target rotational speed NOBJ for normal control.

The valve opening control amount ICMD is controlled so that it is gradually increased after starting the FIRE mode and then decreased. Immediately after the FIRE mode is ended at the time t5, the transient control is performed to gradually decrease the valve opening control amount ICMD.

The retard correction term IGFPI changes as shown by the broken line in FIG. 15B, and the ignition timing IGLOG is controlled to be retarded from the normal control value (IGMAP+IGCR). When the shift position SFT is changed from the neutral position N to the in-gear condition at the time t3, the engine load increases and the retard correction term IGFPI is therefore increased (the retard amount is decreased) to increase the output torque of the engine 1. At the same time, the engine rotational speed NE is maintained at the target rotational speed NEFIR which equals NOBJ.

In FIGS. 15A to 15C, there is shown a state in which, at a time t4, braking is released and the vehicle starts creeping. When the creeping is started, the engine load is slightly reduced, and thereby the engine rotational speed NE is gradually increased and the vehicle speed VP is increased. As a result, the retard correction term IGFPI is gradually reduced (that is, the retard amount is increased).

When the vehicle speed VP reaches the first predetermined vehicle speed VFIRH at time t5, the FIRE mode is ended, and the transient control shifted to the normal control is started. The transient control is performed such that the valve opening control amount ICMD is gradually reduced (that is, the intake air amount is gradually reduced), whereas the retard correction term IGFPI set according to the engine rotational speed NE, which is subjected to the limiting process shown in FIG. 13, is set to the retard limit value (-IGFPILT) shown by the broken line in FIG. 15B and is gradually increased (that is, the retard amount is reduced). It should be noted that the retard correction term IGFPI, if it is not subjected to the limiting process shown in FIG. 13, is reduced as shown by the a dashed line LP in FIG. 15B. When the vehicle speed VP reaches the second predetermined vehicle speed VFBE at time t6, the feedback control of the ignition timing is ended (see steps S106 and S105 shown. in FIG. 9) and the ignition timing IGLOG is set to the normal value (IGMAP+IGCR). At this time, since the absolute value of the retard correction term IGFPI is small, the amount ΔIG of change in the ignition timing is small, with a result that no torque shock occurs.

As described above, according to this embodiment, when the vehicle speed reaches the first predetermined vehicle speed VFIRH or higher during execution of the catalyst temperature rise accelerating control, the reduction in intake air amount is started. When the vehicle speed VP reaches the second predetermined vehicle speed VFBE which is higher than the first predetermined vehicle speed VFIRH, the feedback control (retard control) of the ignition timing according to the engine rotational speed NE is ended. When the vehicle speed VP is between the first predetermined vehicle speed VFIRH and the second predetermined vehicle speed VFBE, the retard limit value IGFPILT of the retard correction term IGFPI is changed in the advance direction according to the increase in vehicle speed VP. As a result, in the case where the vehicle having the automatic transmission starts creeping during execution of the catalyst temperature rise accelerating control, it is possible to prevent the occurrence of a torque shock and hence to maintain good drivability.

In this embodiment, the auxiliary air passage 17 and the auxiliary air control valve 18 are part of the intake air amount control means, and the ECU 5 is a part of the intake air amount control means, the ignition timing control means, and the catalyst temperature rise accelerating means. More specifically, the process shown in FIGS. 2, 3, 5, and 7 correspond to the intake air amount control means and the catalyst temperature rise accelerating means, and the processings shown in FIGS. 8, 9, 10, 12 and 13 correspond to the ignition timing control means and the catalyst temperature rise accelerating means.

According to the above described embodiment, when the catalyst temperature rise accelerating control is ended and the transient control shifted to the normal control is started, the retard limit value IGFPILT is set according to the vehicle speed VP and the retard correction term IGFPI is set to the retard limit value IGFPILT. However, the retard correction term IGFPI or the ignition timing IGLOG calculated by using the retard correction amount IGFPI may be set to a more advanced value With an increase in vehicle speed VP.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed:

1. A control system for an internal combustion engine in a vehicle having an exhaust system provided with a catalyst, comprising:

intake air amount control means for controlling the intake air amount of the engine;

ignition timing control means for controlling the ignition timing of the engine; and catalyst temperature rise accelerating means for increasing, after starting of the engine, the intake air amount and retarding the ignition timing according to the engine rotational speed;

wherein said catalyst temperature rise accelerating means starts reduction of the intake air amount when the speed of the vehicle reaches a first predetermined vehicle speed or higher during operation of said catalyst temperature rise accelerating means, and ends retard control of the ignition timing according to the engine rotational speed when the vehicle speed reaches a second predetermined vehicle speed higher than the first predetermined vehicle speed, and said catalyst temperature rise accelerating means changes the retard limit value of the ignition timing according to the vehicle speed when the vehicle speed is between the first predetermined vehicle speed and the second predetermined vehicle speed.

2. A control system according to claim 1, wherein said catalyst temperature rise accelerating means advances the retard limit value a greater amount as the vehicle speed increases when the vehicle speed is between the first predetermined vehicle speed and the second predetermined vehicle speed.

3. A control system according to claim 1, wherein the operation of said catalyst temperature rise accelerating means is started when the engine rotational speed is equal to or higher than a predetermined lower limit rotational speed and the engine is in an idling condition.

4. A control system according to claim 1, further comprising:

engine coolant temperature detecting means for detecting the engine coolant temperature;

wherein the operating period of said catalyst temperature rise accelerating means is set according to the engine coolant temperature at the starting of the engine.

5. A control system according to claim 1, wherein said catalyst temperature rise accelerating means sets the retard amount of the ignition timing such that the engine rotational speed coincides with a target rotational speed.

6. A control system for an internal combustion engine in a vehicle having an exhaust system provided with a catalyst, comprising:

intake air amount control means for controlling the intake air amount of the engine;

ignition timing control means for controlling the ignition timing of the engine; and catalyst temperature rise accelerating means for increasing, after starting of the engine, the intake air amount and retarding the ignition timing according to the engine rotational speed;

wherein said catalyst temperature rise accelerating means starts shifting between a transient control and a normal control when the vehicle speed reaches a predetermined vehicle speed or higher during operation of said catalyst temperature rise accelerating means, and gradually reduces the intake air amount and sets the ignition timing according to the vehicle speed during the transient control.

7. A control system according to claim 6, wherein said catalyst temperature rise accelerating means advances the ignition timing a greater amount as the vehicle speed increase during the transient control.

8. A control system according to claim 6, wherein the operation of said catalyst temperature rise accelerating means is started when the engine rotational speed is equal to or higher than a predetermined lower limit rotational speed and the engine is in an idling condition.

9. A control system according to claim 6, further comprising:

engine coolant temperature detecting means for detecting the engine coolant temperature;

wherein the operating period of said catalyst temperature rise accelerating means is set according to the engine coolant temperature at the starting of the engine.

10. A control system according to claim 6, wherein said catalyst temperature rise accelerating means sets the retard amount of the ignition timing such that the engine rotational speed coincides with a target rotational speed.

* * * * *